United States Patent [19]

Meyer et al.

[11] Patent Number: 5,720,260
[45] Date of Patent: Feb. 24, 1998

[54] METHOD AND SYSTEM FOR CONTROLLING COMBUSTION STABILITY FOR LEAN-BURN ENGINES

[75] Inventors: Garth M. Meyer, Dearborn; Joseph R. Asik, Bloomfield Hills, both of Mich.

[73] Assignee: Ford Global Technologies, Inc., Dearborn, Mich.

[21] Appl. No.: 768,001

[22] Filed: Dec. 13, 1996

[51] Int. Cl.$^6$ ..................................................... F02M 7/00
[52] U.S. Cl. ............................................................ 123/436
[58] Field of Search ................................... 123/436, 435, 123/492, 493, 481; 73/117.3, 116; 364/431.05, 431.08

[56] References Cited

U.S. PATENT DOCUMENTS

| | | | |
|---|---|---|---|
| 5,263,453 | 11/1993 | Wakahara et al. | 123/436 |
| 5,357,790 | 10/1994 | Hosoya | 73/117.3 |
| 5,421,305 | 6/1995 | Tomisawa | 123/435 |
| 5,426,587 | 6/1995 | Imai et al. | 364/431.05 |
| 5,495,415 | 2/1996 | Ribbens et al. | 364/431.08 |
| 5,515,828 | 5/1996 | Cook et al. | 123/436 |
| 5,587,524 | 12/1996 | Hampo et al. | 73/116 |

FOREIGN PATENT DOCUMENTS

| | | | |
|---|---|---|---|
| 03124909 | 5/1991 | Japan | 123/436 |
| 05231136 | 9/1993 | Japan | 123/436 |
| 05231137 | 9/1993 | Japan | 123/436 |
| 05231138 | 9/1993 | Japan | 123/436 |
| 05312026 | 11/1993 | Japan | 123/436 |
| 06093845 | 4/1994 | Japan | 123/436 |
| 06330741 | 11/1994 | Japan | 123/436 |
| 07071234 | 3/1995 | Japan | 123/436 |
| 07293233 | 11/1995 | Japan | 123/436 |
| 07305644 | 11/1995 | Japan | 123/436 |
| 07310534 | 11/1995 | Japan | 123/436 |
| 08004522 | 1/1996 | Japan | 123/436 |
| 08061052 | 3/1996 | Japan | 123/436 |
| 08100639 | 4/1996 | Japan | 123/436 |
| 08105318 | 4/1996 | Japan | 123/436 |
| 08121147 | 5/1996 | Japan | 123/436 |

OTHER PUBLICATIONS

"238 Development Of A Lean Limit Control System On The 2.5 Liter Lean–Burn MVV Engine", by Yasuki Tamura et al. (Mitsubishi Motors Corp.), JSAE Conference Proceeding 953, 1995–5 (313–316).

Primary Examiner—Raymond A. Nelli
Attorney, Agent, or Firm—Allan J. Lippa; Roger L. May

[57] ABSTRACT

A method and system for controlling combustion stability for a lean-burn engine having a plurality of cylinders including a plurality of cylinder pairs utilizes a speed sensor for sensing an engine speed and generating a corresponding temperature signal and an air flow sensor for sensing a cylinder air mass and generating a corresponding air mass signal. An average event time for each of the plurality of cylinders is determined, as well as an instantaneous variation in event times between each of the plurality of cylinder pairs. An actual level of engine roughness is determined based on the variation in instantaneous event times from the average event times. A desired level of engine roughness is determined based on the speed signal, the air mass signal, and a desired air/fuel ratio. The engine is then controlled based on the actual level of engine roughness and the desired level of engine roughness so as to directly control the combustion stability of the engine and to indirectly control the air/fuel ratio of the engine.

19 Claims, 3 Drawing Sheets

METHOD AND SYSTEM FOR CONTROLLING COMBUSTION STABILITY FOR LEAN-BURN ENGINES

TECHNICAL FIELD

This invention relates to methods and systems for controlling combustion stability for lean-burn engines.

BACKGROUND ART

Automobile fuel economy can be improved by running the engine lean. However, the engine has to be run lean without reaching excessive roughness and/or instability. Development of a system that controls the air fuel ratio (A/F ratio) close to a lean-burn limit based on engine rotation information has greatly contributed to the realization of running an engine near the lean-burn limit.

One known prior art system that controls the A/F ratio based on engine rotation calculates an indicated mean effective pressure (IMEP) based on an input from a cylinder pressure sensor. Angular acceleration is first determined based on a change rate of cyclic Tn, where Tn corresponds to the time of an engine event. The IMEP is then determined based on a change in the angular acceleration and a fuel injection volume. This system, however, fails to identify a base variation between the cylinders which do not reflect combustion instability since the variation could be due to a difference in cylinder air charge, sensor timing mark registration, burn rate, etc.

DISCLOSURE OF THE INVENTION

It is thus a general object of the present invention to provide a method and system for controlling combustion stability for lean-burn engines after learning a base variation in timing events between cylinders.

In carrying out the above objects and other objects, features, and advantages of the present invention, a method is provided for controlling combustion stability of a lean-burn engine. The method includes the steps of sensing an engine speed and generating a corresponding speed signal and sensing a cylinder air mass and generating a corresponding air mass signal. The method also includes the step of determining an event time for each of the plurality of cylinders and determining a variation in event times between each of the plurality of adjacent cylinder pairs. Still further, the method includes the steps of determining an actual level of engine roughness based on the variation in event times and determining a desired level of engine roughness based on the speed signal and the air mass signal. Finally, the method includes the step of controlling the engine based on the actual level of engine roughness and the desired level of engine roughness.

In further carrying out the above object and other objects, features, and advantages of the present invention, a system is also provided for carrying out the steps of the above described method. The system includes a speed sensor for sensing a speed of the engine and generating a corresponding speed signal. The system also includes an air flow sensor for sensing a cylinder air mass and generating a corresponding air mass signal. Still further, the system includes control logic operative to determine an event time for each of the plurality of cylinders, determine a variation in event times between each of the plurality of adjacent cylinder pairs, determine an actual level of engine roughness based on the variation in event times, determine a desired level of engine roughness based on the speed signal and the air mass signal, and control the engine based on the actual level of engine roughness and the desired level of engine roughness.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
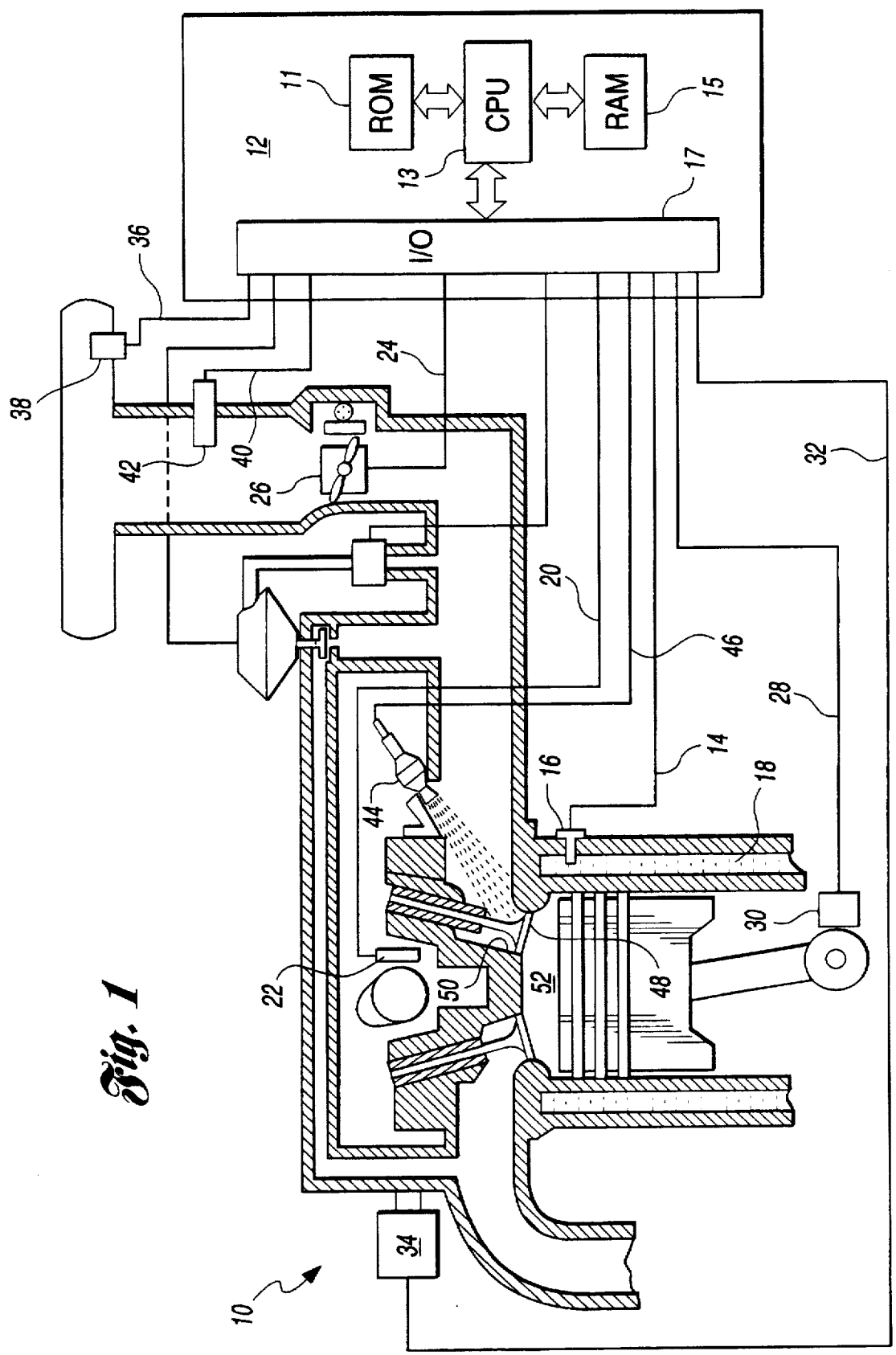
FIG. 1 is a schematic of an internal combustion engine and an electronic engine controller which embody the principles of the present invention.

Turning now to FIG. 1, there is shown an internal combustion engine which incorporates the teachings of the present invention. The internal combustion engine 10 comprises a plurality of combustion chambers, or cylinders, one of which is shown in FIG. 1. The engine 10 is controlled by an Electronic Control Unit (ECU) 12 having a Read Only Memory (ROM) 11, a Central Processing Unit (CPU) 13, and a Random Access Memory (RAM) 15. The ECU 12 receives a plurality of signals from the engine 10 via an Input/Output (I/O) port 17, including, but not limited to, an Engine Coolant Temperature (ECT) signal 14 from an engine coolant temperature sensor 16 which is exposed to engine coolant circulating through coolant sleeve 18, a Cylinder Identification (CID) signal 20 from a CID sensor 22, a throttle position signal 24 generated by a throttle position sensor 26, a Profile Ignition Pickup (PIP) signal 28 generated by a PIP sensor 30, a Heated Exhaust Gas Oxygen (HEGO) signal 32 from a HEGO sensor 34, an air intake temperature signal 36 from an air temperature sensor 38, and an air flow signal 40 from an air flow meter 42. The ECU 12 processes these signals received from the engine and generates a fuel injector pulse waveform transmitted to the fuel injector 44 on signal line 46 to control the amount of fuel delivered by the fuel injector 44. Intake valve 48 operates to open and close intake port 50 to control the entry of the air/fuel mixture into combustion chamber 52.

Figure 2:
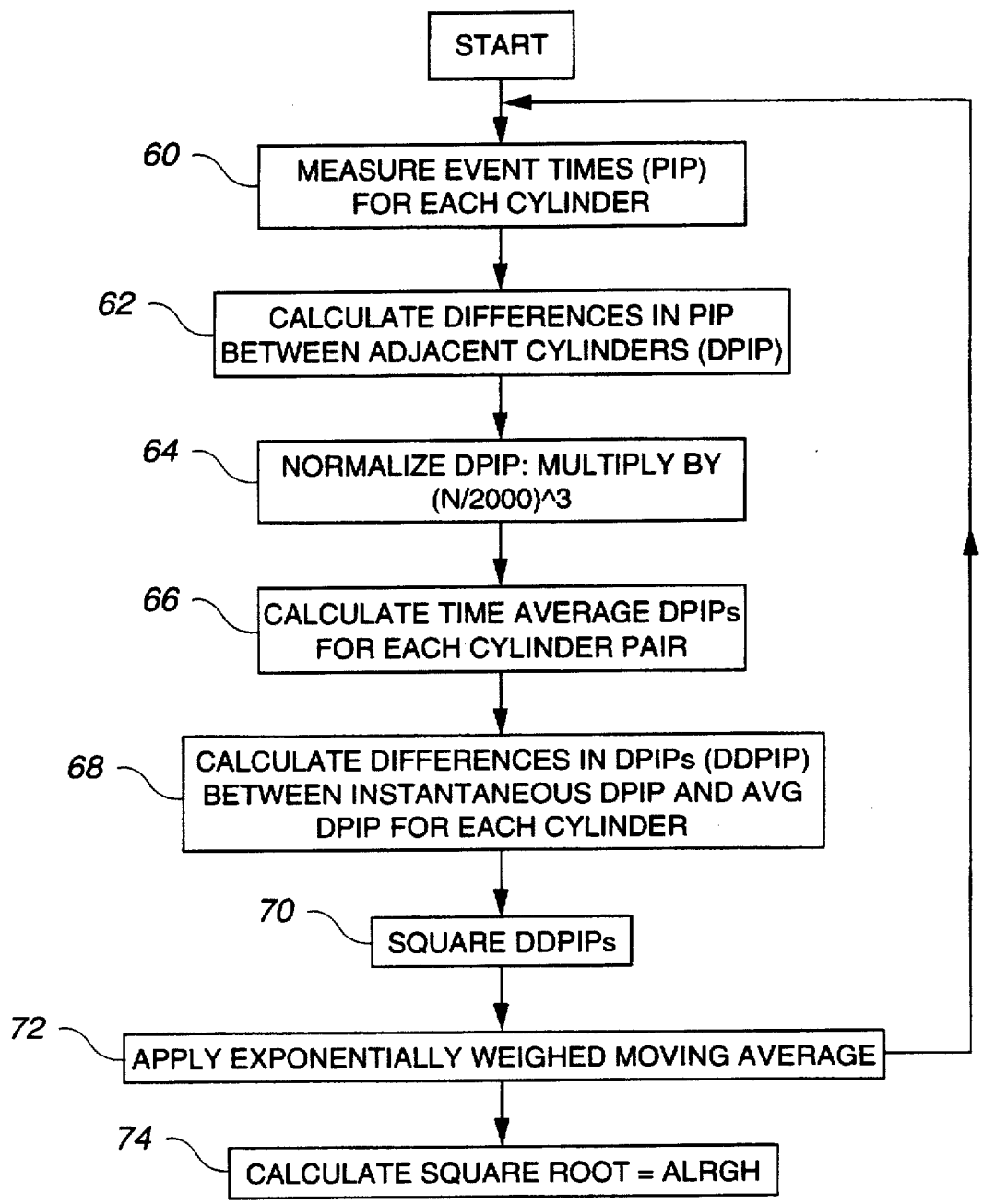
FIG. 2 is a flow diagram illustrating the general sequence of steps associated with the roughness monitor operation of the present invention.
Figure 3:
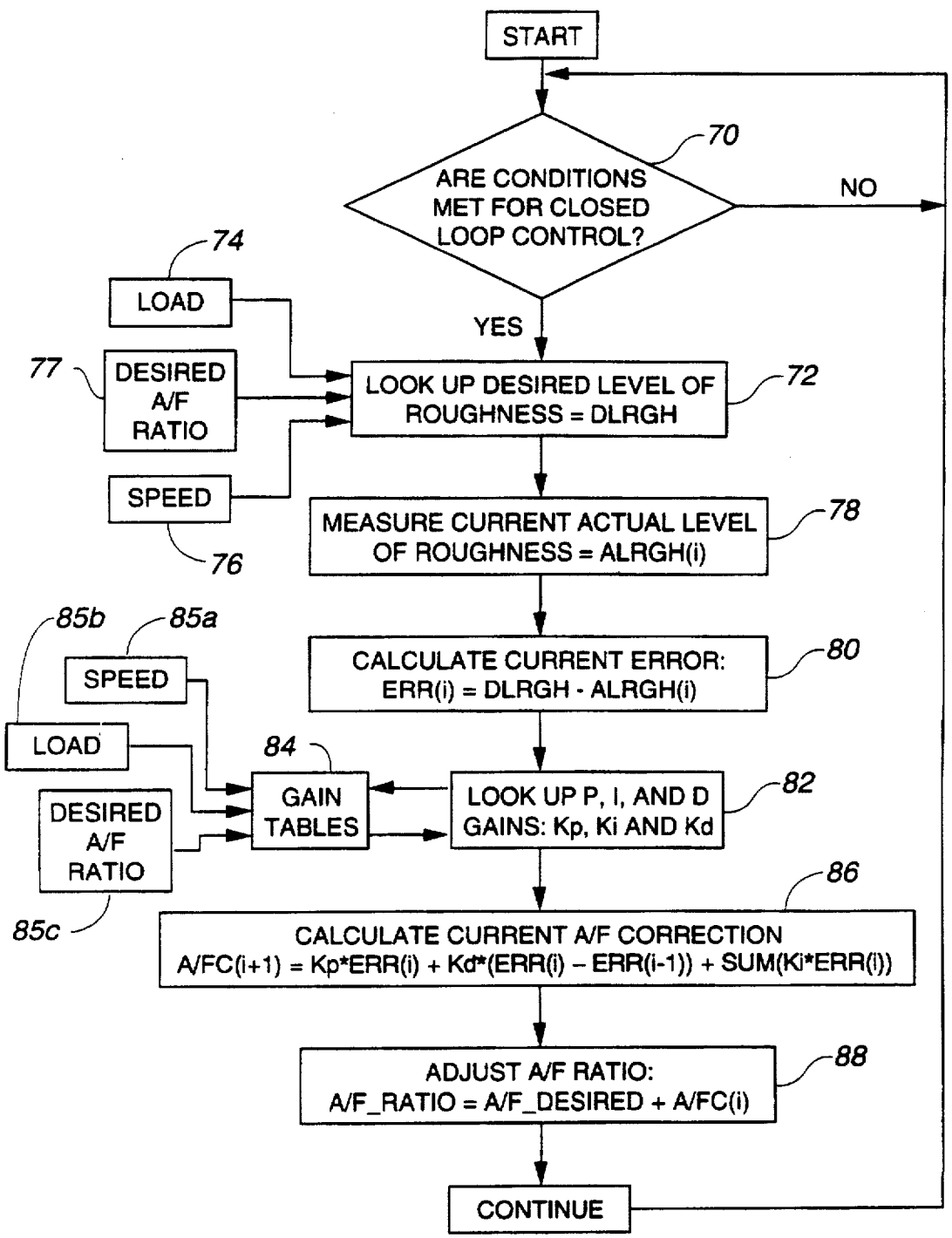
FIG. 3 is a flow diagram illustrating the general sequence of steps associated with the closed loop roughness control operation of the present invention.

Turning now to FIG. 2, there is shown a flow diagram illustrating the general sequence of steps associated with the roughness monitor operation of the present invention, which is performed by a control logic, or the ECU 12. The ECU 12 may be comprised of hardware, software, or a combination thereof, as described above. Although the steps shown in FIGS. 2 and 3 are depicted sequentially, they can be implemented utilizing interrupt-driven programming strategies, object-oriented programming, or the like. In a preferred embodiment, the steps shown in FIGS. 2 and 3 comprise a portion of a larger routine which performs other engine control functions.

The method begins with the step of measuring event times for each cylinder, as shown at block 60. The period, $T_n$, of the cylinder is determined based on the PIP (Profile Ignition Pickup) signal 28. The period, $T_n$, is determined by measuring the time it takes to go from Top Dead Center of one cylinder (TDC) to TDC of the next firing cylinder. This is preferably accomplished by determining a difference in time between the rising edges of the PIP signal. The ECU 12 determines this time by capturing the time at each of the events, i.e., the rising edges of the PIP signal.

The differences in PIP between adjacent cylinders, DPIP, is determined next, as shown at block 62. That is, the difference between the periods of the adjacent cylinders, $T_{n+1}-T_n$, is determined. The differences in PIP is then normalized to remove the effect of rpm (rotation per minute), as shown at block 64. This is done by multiplying the DPIP by $(N/2000)^3$, where N represents the actual rpm and "2000" is a reference rpm. The reference rpm in the preferred embodiment is chosen to be 2000, however, another number can be used.

The normalized PIP differences for each of the cylinder pairs are then subjected to a rolling average, as shown at block 66. By taking an average of the normalized PIP differences for each of the cylinder pairs, the variation between each of the adjacent cylinders is learned.

In addition to determining the average DPIP between adjacent cylinders, the current, or instantaneous, DPIP is compared to the average DPIP to obtain a difference in the DPIPs, DDPIP, as shown at block 68. The DDPIP corresponds to a variation in the DPIP from the average DPIP. The DDPIPs, or variation, is then squared, as shown at block 70. The result is a statistical variance of the deviations of all cylinders from their respective means.

Next, an exponentially weighted moving average (EWMA) of the variances is calculated, as shown at block 72. The EWMA is applied to the squared DDPIPs so that the average keeps track of the previous average, yet is also influenced by new data. Thus, a small fraction of a new value, e.g., 5%, is added to a larger fraction, e.g. 95%, of the previous value. The calculations to this point are carried out in the ECU foreground, i.e., calculations are performed in real time in synchronization with the engine timing marks.

The EWMA of the squared DDPIPs is then passed to the ECU background. To determine the actual level of roughness, ALRGH, of the engine, a square root of the EWMA is calculated, as shown at block 74. The quantity calculated is similar to an AC RMS (root mean square) voltage calculation, except the DC component is the mean PIP time variation from the prior cylinder.

The actual level of roughness, ALRGH, calculated at this point is closely related to the COV (coefficient of variation) of IMEP (indicated mean effective pressure) of each cylinder. COV is a normalized standard deviation, and IMEP corresponds to the pressure on a piston that results in an average torque. A variation in the pressure on the piston relates to a variation in torque, which relates to a variation in rpm. For lean-burn engines, it is important to prevent operation of the engine at or beyond the misfire limit. It is known that engine roughness, as measured by COV of IMEP increases monotonically with increase in A/F ratio, with the slope increasing markedly as the misfire limit is approached. Thus, the engine roughness monitor of the present invention is a precursor to actual engine misfire. Using the roughness monitor described above, it is possible to implement closed loop control of engine A/F ratio and prevent excursion into the misfire region by operating the engine at a fixed but moderate level of engine roughness, as determined by the roughness monitor described above.

FIG. 3 illustrates one method of implementing a closed loop A/F ratio control system based on control of engine roughness. The method begins with the step of determining whether or not predetermined conditions are met for closed loop control, as shown at conditional block 70. The predetermined entry conditions include, but are not limited to, determining whether data are mature, the engine is in lean burn operation, the engine is not in idle, there is no severe acceleration or deceleration, etc.

If the predetermined entry conditions have been met, the method proceeds to determine the desired level of engine roughness, DLRGH, as shown at block 72. The desired level of engine roughness is empirically determined based on load, or normalized cylinder air charge, engine speed, and desired A/F ratio, as shown at blocks 74, 76 and 77, respectively. The actual level of roughness, ALRGH(i), is then determined, as shown at block 78. This value is equivalent to the value calculated at block 74 of FIG. 2.

A current error, ERR(i), in roughness is calculated, as shown at block 80, by determining the difference between the desired level of roughness and the actual level of roughness. A PID (proportional-integral-derivative) controller is utilized to add corresponding gains to the current error, as shown at block 82. The gains, Kp, Ki and Kd, are listed in a gain table, as shown at block 84. The PID gains are scheduled based on the values for engine speed, load, and desired A/F ratio, as shown at blocks 85a, 85b, and 85c, respectively.

A current A/F correction is determined next, as shown at block 86. The current A/F correction represents the amount that the A/F ratio must be corrected in order to return the actual level of roughness, ALRGH, to the desired level of roughness, DLRGH. The current A/F correction, A/FC(i), is calculated by adding together the proportional gain portion, Kp*ERR(i), the differential gain portion, Kd*(ERR(i)−ERR (i−1)), and the integral gain portion, SUM(Ki*ERR(i)), where SUM is a cumulative sum.

The A/F ratio is then adjusted, as shown at block 88. The A/F ratio is equal to a desired A/F ratio plus the A/F correction. The desired A/F ratio is contained in a look-up table that is indexed based on load, engine speed, and engine temperature. Thus, an A/F ratio that the engine should be running at in order to operate at the desired level of roughness is determined based on the actual level of roughness and a correction factor. A fuel pulse width can then be commanded by the ECU 12 based on the adjusted A/F ratio to achieve the desired level of engine roughness.

The present invention includes a learning algorithm in the engine combustion roughness monitor that learns the time average differences in engine event periods on an individual cylinder basis. The actual event time for a given cylinder is compared with the normal event time, as determined through an averaging process.

While the best modes for carrying out the invention have been described in detail, those familiar with the art to which this invention relates will recognize various alternative designs and embodiments for practicing the invention as defined by the following claims.

What is claimed is:

1. A method for controlling combustion stability for a lean-burn engine having a plurality of cylinders that are grouped into a plurality of cylinder pairs, the method comprising:

sensing an engine speed and generating a corresponding speed signal;

sensing a cylinder air mass and generating a corresponding air mass signal;

determining an event time for each of the plurality of cylinders;

determining a variation in event times between each of the plurality of cylinder pairs;

determining an actual level of engine roughness based on the variation in event times;

determining a desired level of engine roughness based on the speed signal and the air mass signal; and controlling the engine based on the actual level of engine roughness and the desired level of engine roughness.

2. The method as recited in claim 1 wherein determining the variation in event times comprises:

determining a difference in the event times for each of the plurality of cylinders that are grouped into one of the plurality of cylinder pairs to obtain a plurality of average cylinder pair differences;

determining a normalized value for each of the average cylinder pair differences; and determining a time average for each of the normalized values.

3. The method as recited in claim 2 wherein determining the actual level of roughness comprises:

determining an instantaneous difference in the event times for each of the plurality of cylinders that are grouped into one of the plurality of cylinder pairs to obtain a plurality of instantaneous cylinder pair differences;

comparing the plurality of instantaneous cylinder pair differences with the plurality of average cylinder pair differences to obtain a variation of the instantaneous cylinder pair differences from the average cylinder pair differences.

4. The method as recited in claim 3 wherein determining the actual level of roughness further comprises:

determining a squared value of the variation of the instantaneous cylinder pair differences from the average cylinder pair differences;

determining a moving average of the squared value; and determining a square root value of the moving average.

5. The method as recited in claim 4 wherein the moving average comprises an exponentially weighted moving average.

6. The method as recited in claim 1 wherein controlling the engine includes controlling the engine to an air/fuel ratio corresponding to the desired level of engine roughness.

7. The method as recited in claim 6 wherein controlling the engine to the air/fuel ratio comprises:

determining an air fuel ratio correction factor based on the actual level of engine roughness and the desired level of engine roughness; and determining a desired air fuel ratio based on the air mass signal.

8. The method as recited in claim 7 wherein determining the air fuel ratio correction factor comprises:

determining a current error based on a difference between the actual level of engine roughness and the desired level of engine roughness; and applying proportional-integral-differential gains to the current error.

9. The method as recited in claim 7 wherein controlling the engine to the air/fuel ratio further comprises summing the air fuel ratio correction factor and the desired air fuel ratio.

10. A system for controlling combustion stability for a lean-burn engine having a plurality of cylinders that are grouped into a plurality of cylinder pairs, the method comprising:

a speed sensor for sensing a speed of the engine and generating a corresponding speed signal;

an air flow sensor for sensing a cylinder air mass and generating a corresponding air mass signal; and control logic operative to determine an event time for each of the plurality of cylinders, determine a variation in event times between each of the plurality of cylinder pairs, determine an actual level of engine roughness based on the variation in event times, determine a desired level of engine roughness based on the speed signal and the air mass signal, and control the engine based on the actual level of engine roughness and the desired level of engine roughness.

11. The system as recited in claim 10 wherein the control logic, in determining the variation in event times, is further operative to determine a difference in the event times for each of the plurality of cylinders that are grouped into one of the plurality of cylinder pairs to obtain a plurality of average cylinder pair differences, determine a normalized value for each of the average cylinder pair differences, and determine a time average for each of the normalized values.

12. The system as recited in claim 11 wherein the control logic, in determining the actual level of roughness, is further operative to determine an instantaneous difference in the event times for each of the plurality of cylinders that are grouped into one of the plurality of cylinder pairs to obtain a plurality of instantaneous cylinder pair differences, compare the plurality of instantaneous cylinder pair differences with the plurality of average cylinder pair differences to obtain a variation of the instantaneous cylinder pair differences from the average cylinder pair differences.

13. The system as recited in claim 12 wherein the control logic, in determining the actual level of roughness, is further operative to determine a squared value of the variation of the instantaneous cylinder pair differences from the average cylinder pair differences, determine a moving average of the squared value, and determine a square root value of the moving average.

14. The system as recited in claim 13 wherein the control logic, in determining the moving average, is further operative to determine an exponentially weighted moving average.

15. The system as recited in claim 10 wherein the control logic is further operative to control the engine to an air/fuel ratio corresponding to the desired level of engine roughness.

16. The system as recited in claim 15 wherein the control logic, in controlling the engine to the air/fuel ratio, is further operative to determine an air fuel ratio correction factor based on the actual level of engine roughness and the desired level of engine roughness.

17. The system as recited in claim 16 wherein the control logic, in determining the air fuel ratio correction factor, is further operative to determine a current error based on a difference between the actual level of engine roughness and the desired level of engine roughness, and apply proportional-integral-differential gains to the current error.

18. The system as recited in claim 16 wherein the control logic, in controlling the engine to the air/fuel ratio, is further operative to sum the air fuel ratio correction factor and the desired air fuel ratio.

19. An article of manufacture for an automotive vehicle having an internal combustion engine with a plurality of cylinders that are grouped into a plurality of cylinder pairs, a speed sensor for sensing an engine speed and generating a corresponding speed signal, and an air mass sensor for sensing a cylinder air mass and generating a corresponding air mass signal, the article comprising:

a computer storage medium having a computer program encoded therein for determining an event time for each of the plurality of cylinders, determining a variation in event times between each of the plurality of cylinder pairs, determining an actual level of engine roughness based on the variation in event times, determining a desired level of engine roughness based on the speed signal and the air mass signal, and controlling the engine based on the actual level of engine roughness and the desired level of engine roughness.

* * * * *